United States Patent
Figi et al.

(10) Patent No.: US 6,701,561 B2
(45) Date of Patent: Mar. 9, 2004

(54) METHOD AND SYSTEM FOR DETECTING FLUID INJECTION FROM STATIONARY TO ROTATING MEMBERS

(75) Inventors: Bruce B. Figi, Rockford, IL (US); Gary R. O'Brien, Riverview, MN (US)

(73) Assignee: Honeywell International Inc., Morristown, NJ (US)

( * ) Notice: Subject to any disclaimer, the term of this patent is extended or adjusted under 35 U.S.C. 154(b) by 262 days.

(21) Appl. No.: 09/951,790

(22) Filed: Sep. 10, 2001

(65) Prior Publication Data

US 2003/0046776 A1 Mar. 13, 2003

(51) Int. Cl.$^7$ ................................................ D06F 33/02
(52) U.S. Cl. ............................ 8/159; 68/23.3; 68/23.5; 68/12.16; 68/12.19
(58) Field of Search .................... 68/23.2, 23.3, 68/23.5, 12.06, 12.16, 12.19, 12.01; 74/573 F; 210/144; 8/158, 159

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,432,253 A | * 2/1984 | Kerlin | |
| 4,537,177 A | * 8/1985 | Steere, Jr. et al. | |
| 4,694,156 A | 9/1987 | Swanberg | 250/214 |
| 4,991,247 A | * 2/1991 | Castwall et al. | |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,343,408 A | * 8/1994 | Chen et al. | |
| 5,376,063 A | 12/1994 | Greenstein | 494/37 |
| 5,490,436 A | 2/1996 | Coyne et al. | 74/573 |
| 5,561,993 A | 10/1996 | Elgersma et al. | 68/23.2 |
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |

(List continued on next page.)

FOREIGN PATENT DOCUMENTS

| | | | | |
|---|---|---|---|---|
| EP | 1 036 875 A2 | 9/2000 | | D06F/39/08 |
| FR | 2 550 660 | 2/1985 | | D06F/39/08 |
| JP | 57-76341 | * | 5/1982 | |

*Primary Examiner*—Frankie L. Stinson
(74) *Attorney, Agent, or Firm*—Kris T. Fredrick; Kermit D. Lopez; Luis M. Ortiz (57) ABSTRACT

Methods and systems are disclosed for detecting mass transfer in a rotating device or rotating system, such as a washing machine or dishwasher. Mass may be transferred from the stationary member to the rotating member. The transfer of the mass from the stationary member to the rotating member may be detected utilizing a sensor. A controller linked to the rotating system thereafter may receive a signal that the transfer of mass has been detected, in response to detecting the transfer of mass, thereby permitting the controller to compensate future mass placements in the rotating system according to measured latencies. The mass may comprise a fluid. The fluid itself may be conductive. A gap is generally configured between the stationary member and the rotating member. At least one wire connected to the sensor may be inserted into a stream of such fluid that is created when injectors are activated. An electrical circuit may be completed when the stream of fluid travels across the gap to at least one other wire connected to the sensor and through sensor circuitry associated with the sensor.

32 Claims, 4 Drawing Sheets

U.S. PATENT DOCUMENTS

| | | | |
|---|---|---|---|
| 5,850,748 A | 12/1998 | Kim et al. | 68/23.2 |
| 5,862,553 A | 1/1999 | Harberl et al. | 8/159 |
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |
| 6,418,758 B1 * | 7/2002 | Ikeda et al. | |
| 6,510,715 B1 * | 1/2003 | Simsek | |

* cited by examiner

METHOD AND SYSTEM FOR DETECTING FLUID INJECTION FROM STATIONARY TO ROTATING MEMBERS

RELATED APPLICATIONS

This application is related to co-pending and co-owned patent applications entitled: 'Method and Apparatus for Reducing Microprocessor Speed Requirements in Data Acquisition Applications,' Honeywell Docket No. M10-01121, U.S. Ser. No. 09/792,996, filed on Feb. 26, 2001, now U.S. Pat. No. 6,507,799; 'Simultaneous Injection Method and System for a Self-Balancing Rotatable Apparatus,' Honeywell Docket H16-26312, U.S. Ser. No. 09/896,763, filed on Jun. 29, 2001, now U.S. Pat. No. 6,532,422; 'Energy-Based Thresholds Applied to Dynamic Balancing,' Honeywell Docket No. H16-02079, U.S. Ser. No. 09/951,798, filed on Sep. 10, 2001, still pending; 'Dynamic Correlation Extension for a Self-Balancing Rotatable Apparatus' Honeywell Docket No. H16-26311, U.S. Ser. No. 09/951,932, filed on Sep. 10, 2001, now U.S. Pat. No. 6,622,105; 'Continuous Flow Method and System for Placement of Balancing Fluid on a Rotating Device Requiring Dynamic Balancing', Honeywell Docket H16-01112, U.S. Ser. No. 10/001,006, filed on Nov. 15, 2001, still pending; 'Dynamic Balancing Application Mass Placement', Honeywell Docket H16-01117, U.S. Ser. No. 10/001,090, filed on Nov. 15, 2001, still pending; 'Fixed-Bandwidth Correlation Window Method and System for a Self-Balancing Rotatable Apparatus,' Honeywell Docket No. M10-02075, U.S. Ser. No. 09/999,594, filed on Nov. 15, 2001, still pending; 'Supervisory Method and System for Improved Control Model Updates Applied to Dynamic Balancing,' Honeywell Docket No. H16-02076, U.S. Ser. No. 10/011,218, filed on Nov. 15, 2001, still pending; 'Data Manipulation Method and System for a Self-Balancing Rotatable Apparatus,' Honeywell Docket No. H16-02078, U.S. Ser. No. 10/000,882, filed on Nov. 15, 200, still pending; 'Resonance Identification Extension for a Self-Balancing Rotatable Apparatus,' Honeywell Docket No. H16-02080, U.S. Ser. No. 10/001,098, filed on Nov. 15, 2001, now U.S. Pat. No. 6,546,354; 'Method and System for Mechanizing Simultaneous Multi-Actuator Actions Applied to Dynamic Balancing,' Honeywell Docket No. H16-26313, U.S. Ser. No. 10/000,255, filed on Nov. 15, 2001, still pending."

TECHNICAL FIELD

The present invention relates to sensor methods and systems. The present invention also relates to sensor methods and systems for use in rotating devices and rotating systems. Additionally, the present invention generally relates to sensors for use in machines for washing articles. The present invention also relates to sensors for detecting fluid transfer in rotating systems.

BACKGROUND OF THE INVENTION

In spin balancing control systems, such as washing machines or other rotating systems or rotating devices, problems are generally associated with injector valve actuation timing variation. Timing variation, in particular, often presents problems. The timing variation is the difference between the intended injection event as dictated by a controller and the actual injection event that occurs in the rotating system or rotating device. In such rotating systems or rotating devices, a rotating member has a certain "out of balance," which can be represented by a vector with phase and magnitude. Such a balance control system or rotating system typically utilizes liquid injector valves to place mass, such as fluid, on the rotating member at certain angles to compensate for the "out of balance". The injectors are generally stationary and project mass or fluid across an air gap to discrete channels on the rotating member that, in turn, directs the mass or fluid to specific angular locations on the rotating member.

Injection timing can be critical to the operation of the rotating system or rotating device because inconsistent actuation of the injector valves may result in the placement of mass or fluid at the wrong location. As rotational speeds increase, the injector valve timing becomes even more critical because a fixed timing error in the injector valve actuation may result in an increased error for angular placement. Ultimately this can result in an unstable or slowly converging control system. Some of the causes of inconsistent injector valve actuation include physical production variation from one valve to the next and the aging of the valve through its lifetime of operations.

Compensation for injector valve variation can be achieved by placing a sensor in an air gap between the stationary valve and rotating member. Typically, however, there is little room to place a sensing element in the air gap. The present inventors have thus come to realize that what is needed to solve the aforementioned problems is a method and system for determining when actual fluid is injected into the rotating system so that little doubt exists where the counter balance has been applied.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with addressing the shortcomings of the prior art, it is one aspect of the present invention to provide sensor methods and systems.

It is another aspect of the present invention to provide methods and system for detecting the transfer of mass in a rotating device or rotating system, such as, for example, a dishwasher, clothes washing machine, circuit board washing machine, etc.

It is yet another aspect of the present invention to provide methods and systems for detecting the transfer of fluid in a rotating device or rotating system.

It is still another aspect of the present invention to provide methods and system for detecting the transfer of fluid from stationary to rotatable members in rotating devices or rotating systems.

It is also an aspect of the present invention to provide methods and systems for detecting the transfer of fluid in a rotating device or rotating system utilizing closed-loop feedback techniques.

In accordance with various aspects of the present invention, methods and systems are disclosed herein for detecting mass transfer in a rotating device or rotating system. Mass may be transferred from the stationary member to the rotating member. The transfer of the mass from the stationary member to the rotating member may be detected utilizing a sensor. Such a sensor may be configured as a stand-alone device that a user installs on a washing machine. A controller linked to the stationary member thereafter may receive a signal that the transfer of mass has been detected, in response to detecting the transfer of mass, thereby permitting the controller to compensate future mass placements in the rotating system according to measured latencies. The mass may comprise a fluid. The fluid itself may be conductive.

A gap is generally configured between the stationary member and the rotating member. One or more wires connected to the sensor may be inserted into a stream of such fluid that is created when injectors are activated. Two wires may preferably be utilized, but additionally wires can be implemented within the gap if necessary. An electrical circuit thus may be completed when the stream of fluid travels through the gap and comes into contact with the wires connected to the sensor and sensor circuitry associated with the sensor. The conductive fluid may have a particular level of conductivity. The level of conductivity is preferably greater than the level of conductivity associated with open air. The sensor may be configured as a capacitive sensor, a contact-type conductivity sensor, a non-contact type conductivity sensor, or an optical sensor.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
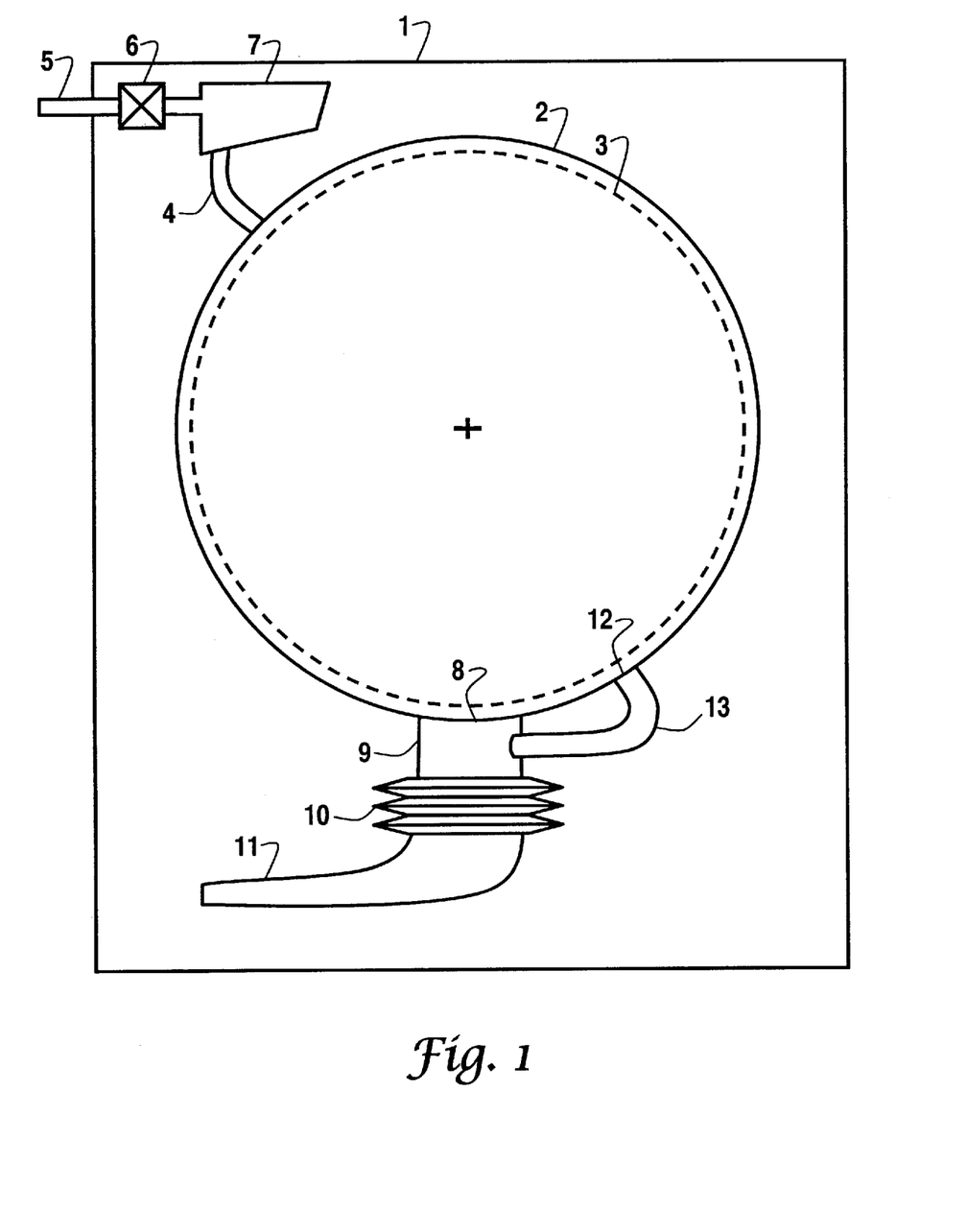
FIG. 1 is a schematic front view of a drum-type washing machine in which embodiments of the present invention may be implemented.

FIG. 1 is a schematic front view of a drum-type washing machine in which embodiments of the present invention may be utilized. Those skilled in the art can appreciate that the drum-type washing machine illustrated in FIG. 1 represents one example of an environment in which the present invention described herein may be implemented. The washing machine illustrated in FIG. 1 is an example of one potential type of rotating system or rotating device in which the present invention may be implemented. (Note that the terms "rotating system," "rotating device" and "rotating apparatus" may be utilized interchangeably herein.)

The present invention is not limited to washing machines, dishwashers and other such machines and environments but may be implemented in any environment in which a need exists to detect the transfer of mass from stationary members to rotating members and to compensate accordingly. The sensor described herein thus may be utilized to detect the transfer of mass, such as a fluid. The drum-type washing machine illustrated in FIG. 1 is thus presented for illustrative purposes only and is not a limiting feature of the present invention. It can be appreciated that the invention described herein may also be utilized for filtration, chemical processing, refining and other liquid-based processes, wherein the drum-type system illustrated in FIG. 1 may be illustrative of a reservoir for various liquids.

The washing machine shown in FIG. 1 has a housing 1, in which a tub 2 (e.g., suds container) is mounted. While the specific details of the tub mounting are not illustrated, it is noted that the tub 2 is capable of vibrating. A laundry drum 3 is rotatably supported about a horizontal axis in the tub 2. Water and, optionally, detergent can be supplied to it in the upper portion of the tub 2 via a line 4 from a supply line 5 via a magnet valve 6 and a detergent dispenser 7. A drain line 9 communicates in fluid-tight fashion with a drain opening 8 in the lower portion of the tub 2. The drain line 9 communicates via bellows creases 10 and a further line 11, with a non-illustrated washwater pump fixedly mounted in the housing 1. Located between the drain line 9 and a further opening 12, which is disposed at a somewhat higher geodetic level than the drain opening 8, there is a line segment 13. Those skilled in the art can appreciate that some, but not all, washing machines may employ this function. Other washing machines may utilize a pump to recirculate the wash water.

Due to the level difference between the openings 8 and 12, there is a steady flow of washwater through the line segment 13 during washing machine operation. The flow occurs into and through the opening 12 to the drain line 9 and back via the drain opening 8 into the tub 2. The flow is based on slight pressure differences in the washwater above the drain opening 8 and the opening 12. Those skilled in the art can appreciate that the washing machine illustrated in FIG. 1 is disclosed herein for illustrative purposes only.

Figure 2:
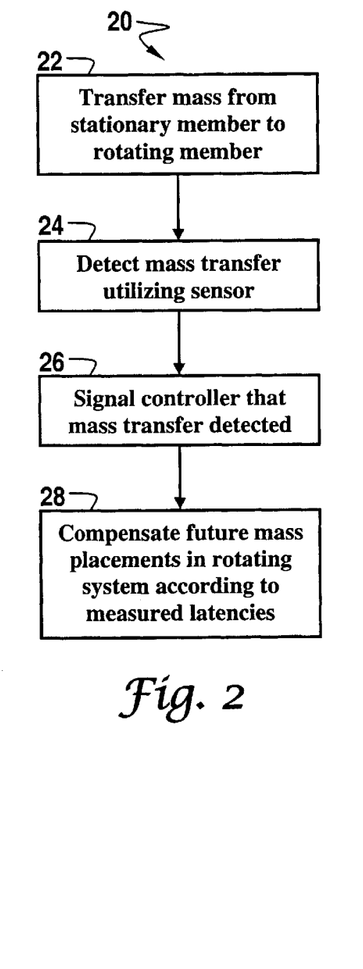
FIG. 2 illustrates a high-level flow chart of operations illustrating operational steps for detecting mass transfer in a rotating system, in accordance with preferred embodiments of the present invention.
Figure 6:
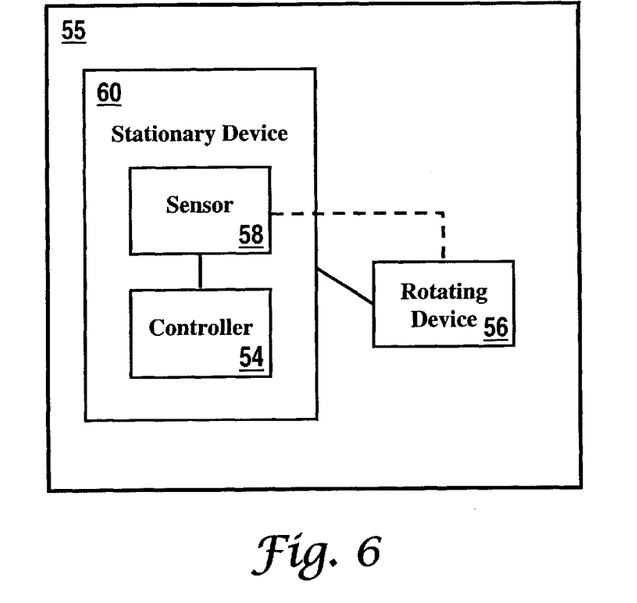
FIG. 6 is a block diagram illustrating a system for detecting mass transfer from a stationary member to a rotating member in a rotating device, in accordance with preferred embodiments of the present invention.
Figure 7:
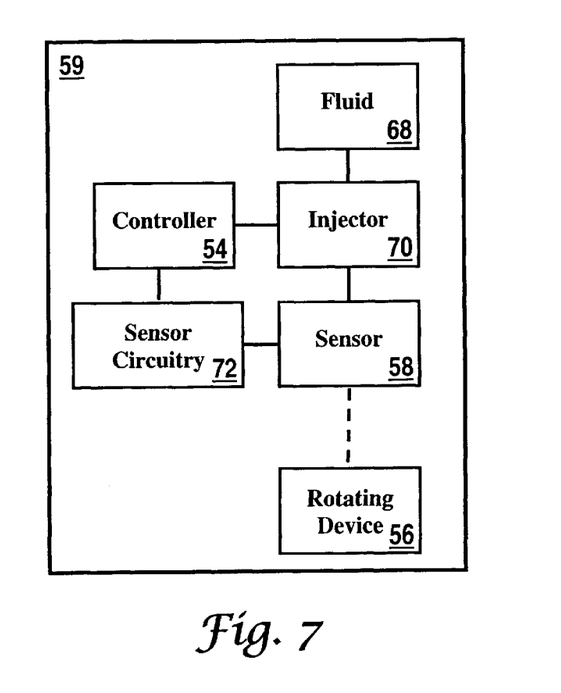
FIG. 7 depicts a block diagram illustrating a system for detecting mass transfer in a rotating device connected to a sensor that includes particular sensor circuitry, in accordance with preferred embodiments of the present invention.

FIG. 2 illustrates a high-level flow chart 20 of operations illustrating operational steps for detecting mass transfer in a rotating system, in accordance with preferred embodiments of the present invention. An example of such a rotating system or rotating device is illustrated by the washing machine of FIG. 1. As illustrated at block 22, mass may be transferred from a stationary member to a rotating member in a rotating system. Note that an example of such stationary and rotating members are illustrated in FIG. 6 herein respectively as stationary device 60 and rotating device 56. The stationary member may be an injector. An example of such an injector is illustrated in FIG. 7 herein as injector 70. Note that as utilized herein the term "injector" can refer to devices, such as valves, nozzles, injectors, or other similar devices well known in the art.

As illustrated at block 24, a transfer of mass from the stationary member to the rotating member is detected utilizing a sensor connected to the stationary member. As indicated next at block 26, a controller linked to the stationary member thereafter receives a signal that the transfer of mass has been detected, thereby permitting the controller, as illustrated at block 28, to compensate future mass placements in the rotating system according to measured latencies.

It is important to note that an additional input to the controller may be required to determine the latency of the mass placement system. This additional input ties the mass placement system to the spinner in a manner that permits the latency of the mass placement system to be calculated. Because mass is placed in an exact location on the rotating system, the exact location of the rotating system with respect to a stationary system or stationary device should be known to determine the latencies.

Figure 3:
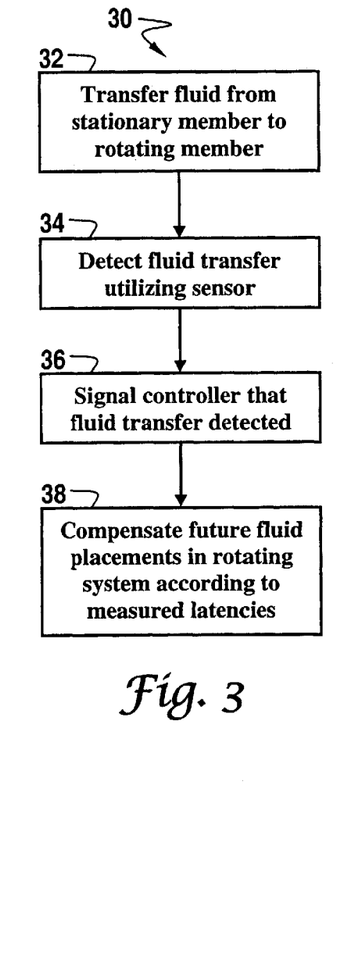
FIG. 3 depicts a high-level flow chart of operations illustrating operational steps for detecting fluid transfer in a rotating system, in accordance with preferred embodiments of the present invention.

FIG. 3 depicts a high-level flow chart 30 of operations illustrating operational steps for detecting fluid transfer in a rotating system, in accordance with preferred embodiments of the present invention. FIG. 3 represents a series of steps that are analogous to the operational steps illustrated in FIG. 2, the difference being that a transfer of fluid in a rotating system is detected rather than simply a transfer of mass. As illustrated at block 32, fluid may be transferred from a stationary member to a rotating member in a rotating system.

Thereafter, as illustrated at block 34, a transfer of fluid from the stationary member to the rotating member is detected utilizing a sensor connected to the stationary member. As indicated next at block 36, a controller linked to the stationary member thereafter receives a signal that the transfer of fluid has been detected, thereby permitting the controller, as illustrated at block 38, to compensate future mass placements in the rotating system according to measured latencies.

Figure 4:
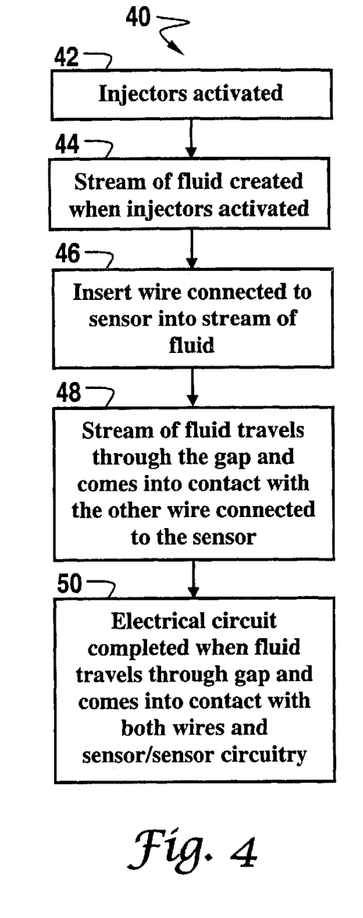
FIG. 4 illustrates a high-level flow chart of operations illustrating additional operational steps for detecting fluid transfer in a rotating system, in accordance with preferred embodiments of the present invention.

FIG. 4 illustrates a high-level flow chart 40 of operations illustrating additional operational steps for detecting fluid transfer in a rotating system, in accordance with preferred embodiments of the present invention. The operational steps indicated in FIG. 4 generally describe a method that may be followed to implement a sensor which detects the actual transfer of liquid or fluid mass from a stationary member to a rotating member to thereby provide a controller with information describing events within the rotating system or rotating device (e.g., the washing machine illustrated in FIG. 1). An example of such a controller is illustrated in FIGS. 5 to 8 herein as controller 54.

Without such a sensor, the controller may activate injectors at a certain time, which, in an ideal situation, may place mass at exact positions identified by the controller. An example of such a sensor is illustrated in FIGS. 5 to 8 herein as sensor 58. Those skilled in the art can appreciate that inconsistent latencies associated with injector actuation may cause unknown errors in mass placement. A sensor, which detects the placement of mass, can inform the controller of the error, thereby permitting the next injection to compensate for the latencies. This approach thus assumes that the behavior of the injector is consistent with respect to the frequency of the injection. The sensor and associated systems and methods thereof, which are described herein, can be configured to include a diagnostic feature to report injector failure or the need for replacement prior to total failure. Without such a sensor, the injectors would have to be manufactured with very little variation from part to part and with little or no drift over their lifetime in particular applications.

Thus, as illustrated at block 42 of flow chart 40, injectors associated with the rotating system or rotating device, may be activated. Such injectors may be stationary members. The fluid may thus be transferred from an injector (e.g., a stationary member) to rotating member within the rotating system. When the injectors are activated, a stream of fluid is generally created, as described at block 44, within the rotating system or rotating device, such as, for example, the washing machine illustrated in FIG. 1. Note that an example of such an injector is illustrated in FIG. 7 herein as injector 70.

An air gap is generally present between the stationary member and rotating member in the rotating system. The tips of two small-diameter wires may be inserted into the stream of fluid that is created when the injector or injectors are activated. Thus, as illustrated at block 46, one or more wires may be inserted into the stream of fluid. The wires are connected to a sensor, which in turn may be linked to the stationary member. The stream of fluid thus travels through the air gap and comes into contact with the other wire, as described at block 48.

Figure 8:
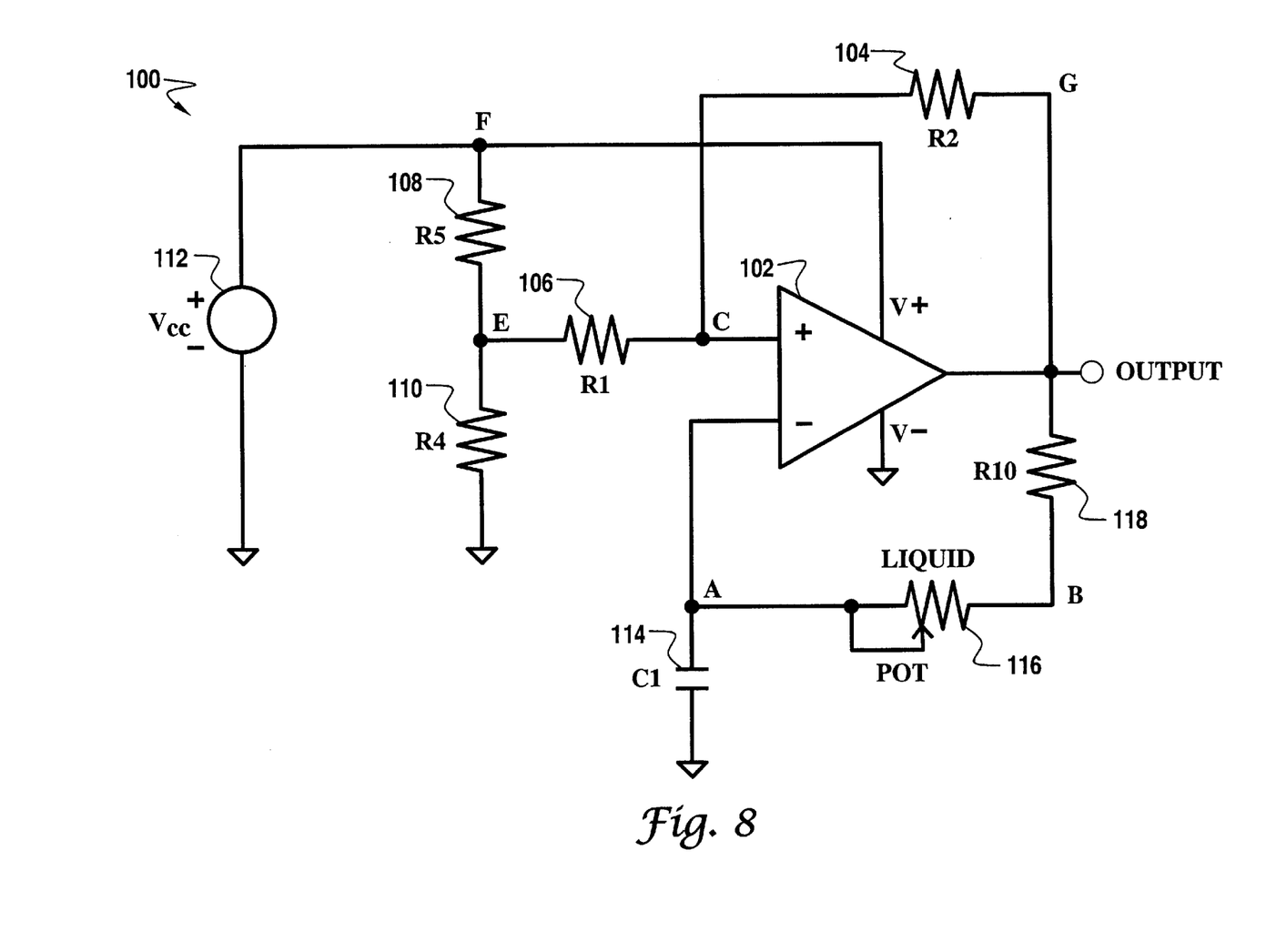
FIG. 8 illustrates a schematic diagram of a fluid detection circuit that may be implemented in accordance with the present invention.

Both wires positioned with the gap thus come into contact with the fluid. An electrical circuit can be completed, as indicated at block 50, from one wire through the fluid or liquid to the other wire and through associated sensor circuitry. The fluid should have some level of conductivity, which is greater than the conductivity of open air. The actual conductivity sensing circuit or sensor circuitry associated with the sensor can be configured in a variety of arrangements. Such sensor circuitry should preferably, however, provide a signal through the fluid being measured that is small in magnitude and alternating in polarity at approximately a 50 percent duty cycle. An example of such sensor circuitry is illustrated in FIG. 7 herein as sensor circuitry 72. Note that an example of sensor circuitry 72 in the form of a schematic diagram is illustrated in FIG. 8 herein as fluid detection circuit 100. This circuit can prevent associated wire probes from being sacrificed by the ion exchange that takes place with a DC signal. With an AC signal, such probes will not degrade. The sensor itself may be configured as a contact-type conductivity sensor, a non-contact conductivity sensor, an optical sensor, and/or a capacitive sensor.

Figure 5:
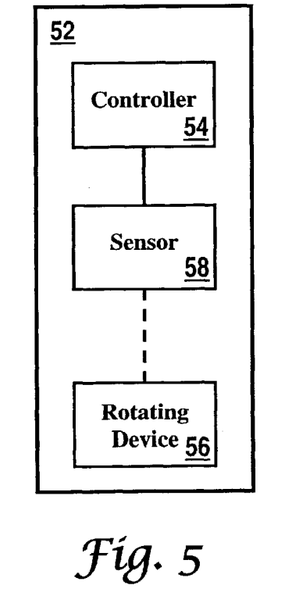
FIG. 5 depicts a block diagram illustrating a system for detecting mass transfer in a rotating device, in accordance with preferred embodiments of the present invention.

FIG. 5 depicts a block diagram illustrating a system 52 for detecting mass transfer in a rotating device 56, in accordance with preferred embodiments of the present invention. In such a system, mass may be transferred from a stationary member, such as an injector, to a rotating member associated with the rotating device 56. Alternatively, mass may be transferred from the stationary member of a stationary device directly to the rotating device. Sensor 58 can be utilized to detect a transfer of mass from the stationary member and/or stationary device to a rotating member of rotating device 56. Controller 54 may receive a signal indicating that the transfer of mass has been detected, thereby permitting controller 54 to compensate future mass placements in rotating device 56 according to measured latencies. Note that in FIGS. 5 to 8 herein, identical or analogous elements are indicated by identical reference numerals. Also note that the term "stationary member" may be utilized synonymously form the term "stationary device" or may refer to a portion (i.e., "member") of the stationary device, depending on a desired implementation of the present invention. Likewise, the term "rotating member" may be utilized synonymously with the term "rotating device" or may simply refer to a portion (i.e., "member") of the rotating device.

FIG. 6 illustrates a block diagram of a system 55 for detecting mass transfer from a stationary device 60 to rotating device 56, in accordance with preferred embodiments of the present invention. Note that system 55 of FIG. 6 is analogous to system 52 of FIG. 5, the difference being that stationary device 60 is illustrated in FIG. 6 and not in FIG. 5. Those skilled in the art can appreciate, of course, that stationary device 60 may be configured as an injector, and thus is generally analogous to injector 70 illustrated in FIG. 7.

FIG. 7 illustrates a block diagram of a system 59 for detecting the transfer of fluid 68 in a rotating device 56 connected to a sensor 58 that includes particular sensor circuitry 72, in accordance with preferred embodiments of the present invention. System 59 is generally analogous to system 55 of FIG. 6 and system 52 of FIG. 5. Fluid 68 may be transferred from injector 70 (i.e., a stationary member) to a rotating member within or connected to rotating device 56. A stream of fluid 68 is generally created when one or more injectors 70 are activated. The tips of two small diameter wires may be then inserted into the stream of fluid 68, providing less interference to the flow of fluid 68.

When the stream of fluid 68 travels across the air gap, as explained previously, an electrical circuit is completed from one wire through fluid 68 to the other wire and through associated sensor circuitry 72. Sensor circuitry 72 preferably provides a signal through fluid 68 that is small in magnitude and alternating in polarity at a 50 percent duty cycle, which prevents associated wire probes from being sacrificed in the ion exchange that takes place in a DC signal. Fluid 68 is generally conductive. A specific example of sensor circuitry 72 is provided in FIG. 8 as fluid detection circuit 100.

FIG. 8 illustrates a schematic diagram of a fluid detection circuit 100 that may be implemented in accordance with the present invention. Fluid detection circuit 100 includes a capacitor 114 connected to ground and an amplifier 102. Capacitor 114, labeled C1 in FIG. 8, may have a value of 0.01 u. Note that the values indicated herein for the various electrical components of fluid detection circuit 100 are presented for illustrative purposes only. It can be appreciated by those skilled in the art that various modifications to fluid detection circuit 100 may be made so long as the general principals taught by the present invention are practiced within particular implementations of the present invention.

Capacitor 114 is generally linked to amplifier 102 at node A. Amplifier 102 may have a value of u1A. Capacitor 114 is also linked to a resistor 116 at node A. Resistor 116 generally forms part of a conductivity probe. Resistor 116 can comprise a POT labeled "LIQUID" which represents the resistance across conductivity probes in the presence or absence of fluid. Resistor 116 may in turn be connected to a resistor 118 at node B. Resistor 118, which is labeled R10 in FIG. 8, could have a value of, for example, 10 k. Resistor 118 is generally connected to the output of amplifier 102 at the node labeled OUTPUT. The output of circuit 100 can be a 50% duty cycle. Vcc can be a square wave generator with a frequency that is dependent on the resistance seen across the conductivity probe.

The output of amplifier 102 is also linked to resistor 104 at node G. Resistor 104 is labeled R2 in FIG. 8. Resistor 104 could have a value of, for example, 100 k. Resistor 104 is linked to resistor 106 at node C. Resistor 104 is also connected to amplifier 102 at node C. Resistor 106 is labeled in FIG. 8 as R1. Resistor 106 could have a value of, for example, 10 k. Resistor 106 is additionally connected to resistors 108 and 110 at node E. Resistor 110 and 108 are respectively labeled R4 and R5 in FIG. 8. Resistor 110 is connected to ground and could have a value of, for example, 1 k. Resistor 108 may also have a value of 1 k. Resistor 108 is generally connected to amplifier 102 at node F and a V+ node of amplifier 102. Note that amplifier 102 may be connected to ground at a V– node. Vcc 112 is generally connected to ground and resistor 108 at node F.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for detecting mass transfer in a rotating system, said method comprising the steps of:

transferring mass from a stationary member to a rotating member;

detecting a transfer of mass from said stationary member to said rotating member utilizing a sensor; and signaling a controller that said transfer of mass has been detected, in response to detecting said transfer of mass, thereby permitting said controller to compensate future mass placements in said rotating system according to at least one measured latency.

2. The method of claim 1 wherein said mass comprises a fluid.

3. The method of claim 1 further comprising the step of: configuring a gap between said stationary member and said rotating member.

4. The method of claim 3 further comprising the steps of: inserting at least one wire connected to said sensor into a stream of said fluid that is created when injectors are activated; and completing an electrical circuit through sensor circuitry associated with said sensor.

5. The method of claim 4 wherein said stream of fluid comprises a fluid having a particular level conductivity.

6. The method of claim 4 wherein said stream of fluid comprises fluid having a level of conductivity greater than a level of conductivity associated with open air.

7. The method of claim 1 wherein said mass comprises a conductive fluid.

8. The method of claim 1 wherein said mass comprises a conductive a fluid having a particular level of conductivity.

9. The method of claim 1 wherein said sensor comprises a capacitive sensor.

10. The method of claim 1 wherein said sensor comprises a contact-type conductivity sensor.

11. The method of claim 1 wherein said sensor comprises a non-contact type conductivity sensor.

12. The method of claim 1 wherein said sensor comprises an optical sensor.

13. The method of claim 1 wherein said stationary member comprises an injector.

14. A method for detecting fluid transfer in a rotating system, said method comprising the steps of:
   transferring fluid from a stationary member to a rotating member;
   detecting a transfer of fluid from said stationary member to said rotating member utilizing a sensor; and
   signaling a controller that said transfer of fluid has been detected, in response to detecting said transfer of fluid, thereby permitting said controller to compensate future fluids placements in said rotating system according to at least one measured latency.

15. A method for detecting fluid transfer in a rotating system, said method comprising the steps of:
   transferring a fluid from a stationary member to a rotating member, wherein said fluid comprises a conductive fluid having a particular level of conductivity;
   detecting a transfer of fluid from said stationary member to said rotating member utilizing a sensor; and
   signaling a controller that said transfer of fluid has been detected, in response to detecting said transfer of fluid, thereby permitting said controller to compensate future fluids placements in said rotating system according to at least one measured latency.

16. A method for detecting fluid transfer in a rotating device, said method comprising the steps of:
   transferring a fluid having a particular level of conductivity from a stationary member to a rotating member wherein a gap is formed between said stationary member and said rotating member, such that said stationary member comprises an injector;
   inserting at least one wire connected to said sensor into a stream of said fluid that is created when injectors are activated;
   completing an electrical circuit when said stream of said fluid travels across said gap to at least one other wire connected to a sensor linked to said rotating system and through sensor circuitry associated with said sensor;
   detecting a transfer of said fluid from said stationary member to said rotating member utilizing said sensor, in response to transferring said fluid from said stationary member to said rotating member; and
   signaling a controller that said transfer of said fluid has been detected, in response to detecting said transfer of said fluid, thereby permitting said controller to compensate future fluid placements in said rotating system according to at least one measured latency, wherein said rotating system comprises a washing machine.

17. A system for detecting mass transfer in a rotating device, said system comprising:
   mass transferred from a stationary member to a rotating member;
   a sensor for detecting a transfer of mass from said stationary member to said rotating member, in response to transferring mass from said stationary member to said rotating member; and
   a controller linked to said rotating device, wherein said controller receives a signal that said transfer of mass has been detected, in response to detecting said transfer of mass, thereby permitting said controller to compensate future mass placements in said rotating device according to at least one measured latency.

18. The system of claim 17 wherein said mass comprises a fluid.

19. The system of claim 17 wherein said stationary member and said rotating member have a gap formed therebetween.

20. The system of claim 19 further comprising the steps of:
   at least one wire connected to said sensor, wherein said at least one wire is inserted into a stream of said fluid that is created when injectors are activated; and
   an electrical circuit completed when said stream of said fluid travels across said gap to at least one other wire connected to said sensor and through sensor circuitry associated with said sensor.

21. The system of claim 20 wherein said stream of fluid comprises a fluid having a particular level conductivity.

22. The system of claim 20 wherein said stream of fluid comprises fluid having a level of conductivity greater than a level of conductivity associated with open air.

23. The system of claim 17 wherein said mass comprises a conductive fluid.

24. The system of claim 17 wherein said mass comprises a conductive a fluid having a particular level of conductivity.

25. The system of claim 17 wherein said sensor comprises a capacitive sensor.

26. The system of claim 17 wherein said sensor comprises a contact-type conductivity sensor.

27. The system of claim 17 wherein said sensor comprises a non-contact type conductivity sensor.

28. The system of claim 17 wherein said sensor comprises an optical sensor.

29. The system of claim 17 wherein said stationary member comprises an injector.

30. A system for detecting fluid transfer in a rotating device, said system comprising:
   fluid transferred from a stationary member to a rotating member;
   a sensor for detecting a transfer of said fluid from said stationary member to said rotating member, in response to transferring said fluid from said stationary member to said rotating member; and
   a controller linked to said rotating device, wherein said controller receives a signal indicating that said transfer of said fluid has been detected, in response to detecting said transfer of said fluid, thereby permitting said controller to compensate future fluid placements in said rotating device according to at least one measured latency.

31. A system for detecting fluid transfer in a rotating device, said system comprising:
   fluid transferred from a stationary member to a rotating member, wherein said fluid comprises a conductive fluid having a particular level of conductivity;
   a sensor for detecting a transfer of said fluid from said stationary member to said rotating member; and
   a controller linked to said rotating device, wherein said controller receives a signal indicating that said transfer of said fluid has been detected, in response to detecting said transfer of said fluid, thereby permitting said controller to compensate future fluid placements in said rotating device according to at least one measured latency.

32. A system for detecting fluid transfer in a rotating device, said system comprising:

a fluid having a particular level of conductivity, wherein said fluid is transferred from a stationary member to a rotating member through a gap formed between said stationary member and said rotating member, such that said stationary member comprises an injector;

at least one wire connected to said sensor, wherein said at least one wire is inserted into a stream of said fluid that is created when injectors are activated;

an electrical circuit completed when said stream of said fluid travels across said gap to at least one other wire connected to a sensor linked to said rotating device and through sensor circuitry associated with said sensor;

a sensor for detecting a transfer of said fluid from said stationary member to said rotating member; and a controller linked to said rotating device, wherein said controller receives a signal indicating that said transfer of said fluid has been detected, in response to detecting said transfer of said fluid, thereby permitting said controller to compensate future fluid placements in said rotating device according to at least one measured latency, wherein said rotating device comprises a washing machine.

* * * * *

UNITED STATES PATENT AND TRADEMARK OFFICE
CERTIFICATE OF CORRECTION

PATENT NO. : 6,701,561 B2
DATED : March 9, 2004
INVENTOR(S) : Bruce B. Figi and Gary R. O'Brien It is certified that error appears in the above-identified patent and that said Letters Patent is hereby corrected as shown below:

<u>Title page,</u>
Item [75], the correct address for "Gary R. O'Brien" should read -- Riverview, MI -- (i.e., Michigan rather than "Minnesota".

Signed and Sealed this

Twenty-seventh Day of July, 2004

JON W. DUDAS
*Acting Director of the United States Patent and Trademark Office*